United States Patent [19]

Suzuki et al.

[11] 4,173,592

[45] Nov. 6, 1979

[54] HEAT-RESISTANT RESIN COMPOSITION

[75] Inventors: Shuichi Suzuki, Yokohama; Moriyasu Wada, Naka; Sadao Kajiura, Yokohama; Takeo Ito, Kawasaki, all of Japan

[73] Assignee: Tokyo Shibaura Electric Co., Ltd., Kawasaki, Japan

[21] Appl. No.: 898,673

[22] Filed: Apr. 21, 1978

[30] Foreign Application Priority Data

Apr. 28, 1977 [JP] Japan .................................. 52/48447

[51] Int. Cl.$^2$ ...................... C08K 5/15; C08L 63/00; C08L 79/08
[52] U.S. Cl. ................................ 525/134; 260/30.4 N; 260/30.4 EP; 525/140
[58] Field of Search ......... 260/844, 857 BA, 857 UN, 260/839, 841, 831, 848, 30.4 N, 30.4 EP

[56] References Cited

U.S. PATENT DOCUMENTS 4,038,251  7/1977  Forgo et al. .......................... 260/844

FOREIGN PATENT DOCUMENTS 52-994  6/1977  Japan .

OTHER PUBLICATIONS

Lee and Neville, "Handbook of Epoxy Resins", p. 25, 1967.
Catalogue of Toshiba Insulating Varnish, 1967, p. 3.
Hui, J. Chem. Soc., (b) 1970(7), 402.

Primary Examiner—Allan Lieberman
Attorney, Agent, or Firm—Oblon, Fisher, Spivak, McClelland & Maier

[57] ABSTRACT

A heat-resistant resin composition having for its essential components (A) at least one maleimide compound obtained by reacting a condensation product of aniline, a phenolic compound and formaldehyde with an acid anhydride reactant containing at least 40 mole percent of maleic anhydride and (B) at least one compound selected from the group consisting of polyallyl phenyl ether compounds and polyallylphenolic compounds each having at least two allyl radicals.

11 Claims, No Drawings

HEAT-RESISTANT RESIN COMPOSITION

BACKGROUND OF THE INVENTION

I. Field of the Invention

This invention relates to heat-resistant resin compositions and, more particularly, to a highly heat-resistant thermosetting resin composition which, when cured, exhibits excellent electrical and mechanical properties even at high temperatures above 150° C.

II. Description of the Prior Art

Heat-resistant resins are often used for electrical insulating materials which are to be exposed to high temperatures. Among such heat-resistant resins are known maleimide resins obtained by reaction of amines which maleic anhydride. When cured to polymerize, these maleimide resins not only exhibit excellent heat resistance, but also provide a dense cured texture because the curing reaction is an addition reaction and does not yield any volatile low molecular weight by-product. However, these maleimide resins have low solubility in common organic solvents and require strongly polar high-boiling solvents such as dimethylformamide, dimethylacetamide and N-methylpyrrolidone in order to bring them into solution. This makes them hard to handle.

In addition, epoxy resins derived from phenol novolak and cresol novolak are also known as the heat-resistant resins that are widely used in practical applications. However, if these epoxy resins are exposed to high temperatures above 150° C. for a long period of time, their mechanical properties and electrical insulating properties will be deteriorated to a remarkable degree. Thus, they are not suitable for use as electrical insulating materials which are to be used under such conditions.

Furthermore, it is also in current practice to blend the aforesaid maleimide resins with, for example, epoxy resins for the purpose of improving their properties. However, since the maleimide resins are poor in solubility with epoxy resins and the like, the resulting blends generally tend to form a precipitate in the vicinity of room temperature and, therefore, have the disadvantage of being difficult to use in solventless applications.

SUMMARY OF THE INVENTION

It is an object of this invention to provide a novel heat-resistant resin composition exhibiting excellent heat resistance and electrical insulating properties.

Another object of this invention is to provide a heat-resistant thermosetting resin composition suitable for use in applications such as impregnation, casting, molding, laminating, bonding, etc.

A further object of this invention is to provide a heat-resistant resin composition applicable as a solventless resin composition.

A still further object of this invention is to provide a heat-resistant resin composition easily soluble in low-boiling solvents.

The heat-resistant resin composition of this invention comprises (A) at least one maleimide compound obtained by reacting a polyamino condensation product of aniline, a phenolic compound and formaldehyde with an acid anhydride reactant containing at least 40 mole percent of maleic anhydride; and (B) at least one allyl compound selected from the group consisting of polyallyl phenyl ether compounds and polyallylphenolic compounds each having at least two allyl radicals.

Up to 60% by weight of the component A may be replaced by N-substituted monomaleimides or N,N'-disubstituted bismaleimides.

In addition, as will be hereinafter described, the heat-resistant resin composition of the invention may include comonomers, epoxy resins, and/or curing agents.

DETAILED DESCRIPTION OF THE PREFERRED EMBODIMENTS

The heat-resistant resin composition of the invention will be more fully described hereinafter with regard to each of its components.

COMPONENT A

As previously described, the component A in the heat-resistant resin composition of the invention is at least one maleimide compound obtained by reacting a polyamino condensation product of aniline, a phenolic compound and formaldehyde with an acid anhydride reactant. The phenolic compound used for the preparation of the aniline-phenolic compound-formaldehyde condensation product is an aromatic hydroxy compound having at least one hydroxyl group directly attached to a carbon atom in the aromatic ring, and may contain one or more hydrocarbon substituent groups and/or non-hydrocarbon substituent groups. Specific examples of the phenolic compound are phenol; aliphatic-substituted phenols such as o- and p-allylphenols, o-, m- and p-cresols, tert-butylphenol, o- and m-ethylphenols, nonylphenol and dimethylphenol; halo-substituted phenols such as o-chlorophenol, 2,4-dichlorophenol and p-bromophenol; aromatic-substituted phenols such as p-phenylphenol; bisphenols such as 2,2-di(p-hydroxyphenyl)propane and p,p'-dihydroxydiphenylmethane; dihydric phenols such as resorcin and hydroquinone; fused ring type phenols such as 2-hydroxynaphthalene; and amino-substituted phenols such as o- and p-aminophenols, 2-methyl-4-aminophenol, N-methyl-p-aminophenol, N-methyl-m-aminophenol and p-hydroxy-N,N'-dimethylaniline, and the like.

The polyamino condensation product can generally be prepared by reacting aniline, a phenolic compound and formaldehyde with one another in a solvent (e.g. water or an organic solvent such as alcohol) in the presence of an acid catalyst, according to any one of several processes. One convenient process comprises adding an acid catalyst to a mixture of aniline and a phenolic compound, heating the resulting homogeneous mixture to a temperature of about 60°-130° C., adding an aqueous formaldehyde solution to the mixture while keeping it at that temperature, and thereafter heating the mixture at a temperature of about 70°-135° C. for a period of about 1-3 hours. Examples of the acid catalyst include inorganic acids such as hydrochloric acid; and organic acids such as formic acid, acetic acid, propionic acid, oxalic acid, malonic acid, maleic acid, fumaric acid, itaconic acid, lactic acid, phthalic acid and salicylic acid.

Where an inorganic acid is used as the catalyst, it is neutralized by adding a base to the reaction mixture after completion of the reaction. Then, the reaction mixture is separated into an organic layer and an aqueous layer. After the aqueous layer is removed, the remaining organic layer is washed repeatedly with water and then distilled to remove any water and unreacted reactants to obtain a desired product.

On the other hand, where an organic acid is used as the catalyst, the reaction mixture may be directly distilled under reduced pressure to remove any water and unreacted reactants to obtain a desired product.

Another process for preparing the aniline-phenolic compound-formaldehyde condensation product involves reacting a phenolic compound with formaldehyde at about 70°–100° C. for 1–3 hours in the presence of a basic catalyst such as alkali metal hydroxide, ammonia or amine to form a methylol compound. After the reaction mixture is acidified, aniline is added to react with the methylol compound, yielding a desired product.

The relative proportions of aniline, the phenolic compound and formaldehyde may be suitably determined depending on the intended purpose or use (i.e., desired heat resistance of the final resin composition, desired compatibility of the resulting condensation product with the component B, and the like). In the practice of this invention, aniline and the phenolic compound are generally considered to be substantially equivalent in reactivity with formaldehyde. The ratio of the total moles of aniline and the phenolic compound to the moles of formaldehyde is usually in the range of from 10:1 to 1:4 and more usually in the range of 5:1 to 1:2. As the molar ratio of aniline to the phenolic compound increases, the final resin composition tends to improve in heat resistance but the resulting condensation product tends to decrease in compatibility with the component B, and vice versa. Usually, the molar ratio of aniline to the phenolic compound is in the range of from 5:95 to 95:5.

In the polyamino condensation product, the equivalent ratio of the amino groups derived from aniline to the hydroxyl groups derived from the phenolic compound is generally in the range of from 5:95 to 95:5 and preferably in the range of 10:90 to 95:5.

The polyamino condensation product is reacted with an acid anhydride reactant comprising maleic anhydride to produce a corresponding amic acid. Then, the amic acid is heated at a temperature of about 60°–90° C. in a solvent such as acetone in the presence of a ring-closing agent such as a lower acid anhydride (e.g. acetic anhydrice), a tertiary amine, or an alkali metal or alkaline earth metal salt of an organic acid (e.g. acetic acid) to produce a maleimide compound which can be used as the component A in the heat-resistant resin composition of the invention.

The acid anhydride reactant used in this reaction contains, as previously described, at least 40 mole percent of maleic anhydride. Specific examples of the other acid anhydrides which may be suitably used in combination with maleic anhydride include 3- or 4-methyltetrahydrophthalic anhydride, tetrahydrophthalic anhydride, hexahydrophthalic anhydride, nadic anhydride, methylnadic anhydride, succinic anhydride, methylsuccinic anhydride, dodecylsuccinic anhydride and octadecylic anhydride. If the content of maleic anhydride in the acid anhydride reactant is lower than 40 mole percent, the final resin composition will have a low crosslink density after having been cured and, therefore, fail to exhibit satisfactory heat resistance.

The aniline-phenolic compound-formaldehyde condensation product is usually reacted with the acid anhydride reactant at a temperature of 60°–90° C. in a polar aprotic solvent such as dimethylformamide, dimethylacetamide or N-methyl-2-pyrrolidone. They are used in such a proportion that the ratio of amine equivalents to acid equivalents is generally 1:1 or lower and preferably in the range of from 1:1.1 to 1:2.

COMPONENT B

The other component in the heat-resistant resin composition of the invention is a polyallyl phenyl ether compound having at least two allyloxy radicals, a polyallylphenolic compound having at least two allyl radicals, or a mixture of two or more of these compounds. The term "polyallyl phenyl ether" or "polyallylphenolic compound" is intended to mean a phenyl compound having two or more allyl radicals. Namely, "polyallyl phenyl ether" means an allyl phenyl ether containing two or more allyloxy radicals, and "polyallylphenolic compound" a phenolic compound containing two or more allyl radicals.

Usually, the polyallyl phenyl ether compounds useful for the component B can be prepared by reacting a phenolic compound with an allyl halide (e.g. allyl chloride or allyl bromide) under reflux in an inert solvent (e.g. water or alcohol) in the presence of an alkaline catalyst (e.g. sodium hydroxide or potassium hydroxide). Specific examples of the phenolic compound useful for this purpose are bisphenol A, bisphenol F, bisphenol S, pyrogallol, resorcin, catechol, hydroquinone, and various phenolic resins obtained by reaction of phenol with an aldehyde (e.g. formaldehyde) or a ketone (e.g. acetone).

The polyallylphenolic compound useful for the component B can be prepared by subjecting the aforesaid polyallyl phenyl ether compound to the Claisen rearrangement. The method of effecting the Claisen rearrangement is well known to those skilled in the art and described in a variety of publications such as, for example, the section entitled "The Claisen Rearrangement" in "Organic Reactions" by Goger Adams, Vol. II (John Wiley & Sons, Inc., 1944). Generally, a polyallyl phenyl ether compound is converted into a corresponding polyallylphenolic compound by heating at a temperature of 180°–250° C. in a high-boiling solvent.

The polyallylphenolic compounds can also be prepared by reacting an orthoallylphenolic compound with an aldehyde (e.g. formaldehyde) or a ketone (e.g. acetone). The reaction with formaldehyde is carried out at a relatively high temperature (e.g. 60°–150° C.) in the presence of an acidic catalyst, while the reaction with acetone is carried out at a relatively low temperature (e.g. 30°–80° C.), using a condensing agent such as strong acid (e.g. HCl or $H_2SO_4$), occasionally, in the presence of a catalyst (e.g. $FeCl_3$ or $H_2S$).

The preferred polyallyl phenyl ether compounds are bis(allyl phenyl ether)s of the general formula:

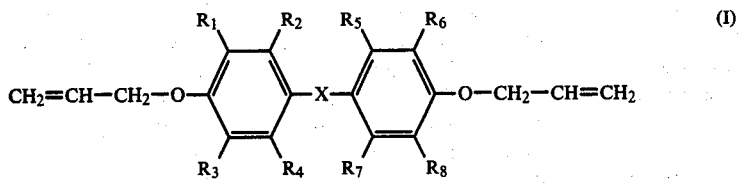

where X is a divalent radical such as —CH₃—,

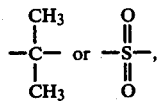

and R₁ through R₈ are monovalent radicals such as hydrogen, alkyl or halo radicals and may be the same as or different from one another, and poly(allyl phenyl ether)s of the general formula:

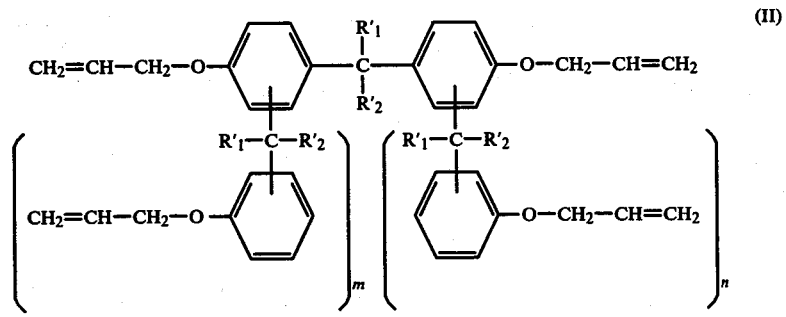

where R'₁ and R'₂ are monovalent radicals such as hydrogen, alkyl, or phenyl radicals and may be the same as or different from each other, and m and n are whole numbers of from 0 to 4 and may be the same as or different from each other.

Similarly, the preferred polyallylphenolic compounds are bis(allylphenol)s of the general formula:

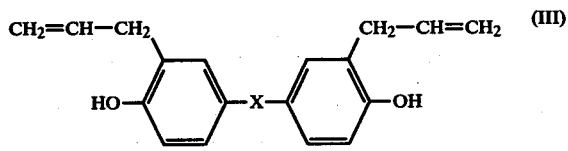

where X is as previously defined, and poly(allylphenol)s of the general formula:

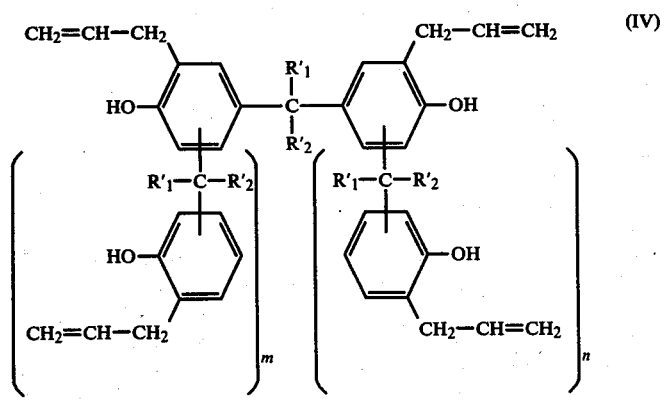

where R'₁, R'₂, m, and n are as previously defined.

The relative proportions of the components A and B in the heat-resistant resin composition of the invention may be suitably selected depending on the intended use, the desired heat resistance, and the like. Generally the components A and B are present in such relative amounts that they can react with each other to produce a cured resin having satisfactory heat resistance (e.g. resistance to high temperatures of 150° C. or more). Preferably, the component A constitutes from about 20 to 95% by weight of the composition, and the component B constitutes from about 5 to 80% by weight of the composition.

While the two components A and B are indispensable to the heat-resistant resin composition of the invention, part (generally up to 60% by weight) of the component A may be replaced by N,N'-disubstituted bismaleimides such as N,N'-ethylene-bismaleimide, N,N'-phenylene-bismaleimide, N,N'-hexamethylene-bismaleimide, N,N'-methylene-di-p-phenylene-bismaleimide, N,N'-oxy-di-p-phenylene-bismaleimide, N,N'-xylylene-bismaleimide, N,N'-[(3,3'-dimethyl)-p,p'-diphenylmethane]-bismaleimide, N,N'-(3,3'-dichloro-p,p'-biphenylene)-bismaleimide, N,N'-(4,4'-benzophenone)-bismaleimide and N,N'-(3,3'-diphenylsulfone)-bismaleimide, or N-substituted monomaleimide such as N-phenylmaleimide and N-propylmaleimide.

In addition, if it is desired to reduce the viscosity of the composition and impart flexibility to the cured resin, the heat-resistant resin composition of the invention may also contain at least one vinyl compound copolymerizable with the component A or B in a proportion of up to about 40% by weight based on the total weight of the components A and B. Specific examples of the vinyl compound are styrene, α-methylstyrene, hydroxyvinylphenol, vinyltoluene, allylphenol, allyloxybenzene, allyloxytoluene, diallyl phthalate, triallyl isocyanurate, triallyl cyanurate, acrylate, methacrylate, acrylonitrile, allyl glycidyl ether, methyl allyl ketone and N-allylacrylamide.

Furthermore, depending on the intended use, the desired moldability, and certain purposes such as those of improving the bonding properties of the composition and of reducing the viscosity of the composition, the heat-resistant resin composition of the invention may also contain one or more epoxy resins in such an amount as to provide not greater than three epoxy equivalents for each —OH group present in the composition.

The epoxy resins useful for this purpose are, for example, bisphenol A type epoxy resins, bisphenol F type epoxy resins, phenol novolak type epoxy resins, cresol novolak type epoxy resins, alicyclic epoxy resins, heterocyclic epoxy resins such as triglycidyl isocyanate and hydantoin epoxy resins, hydrogenated bisphenol A type epoxy resins, aliphatic epoxy resins such as propylene glycoldiglycidyl ether and pentaerythritol-polyglycidyl ether, epoxy resins obtained by reaction between an aromatic carboxylic acid and epichlorohydrin, epoxy resins containing a spiro-ring, glycidyl ether type epoxy resins obtained by reaction of epichlorohydrin with orthoallylphenol novolak compounds, and glycidyl ether type epoxy resins obtained by reaction of epichlorohydrin with allylbisphenol A compounds in which each of the allyl radicals is ortho to each of the hydroxyl radical of bisphenol A.

Specific examples of these epoxy resins and the preparation thereof are described in Henry Lee & Kris Neville, "Handbook of Epoxy Resins" (McGraw-Hill Book Company, 1967), H. Kakiuchi (ed.), "Epoxy Resins" (Shōkōdō K.K., Japan, 1967), and K. Hashimoto (ed.), "Epoxy Resins," 7th edition (Nikkan Kōgyō Shinbunsha, Japan, 1976), and many of them are commercially available.

The heat-resistant resin composition of the invention can be cured either by simply heating at a temperature between 160° C. and 200° C. or by adding one or more curing agents prior to or at the time of curing and then heating at a temperature between 140° C. and 180° C. Specific examples of the curing agents are boron trifluoride-amine complexes such as boron trifluoride-monoethylamine complex and boron trifluoride-piperidine complex; tertiary amines such as triethylamine, benzyldimethylamine and N,N-dimethylaniline; borates such as triphenyl borate and tricresyl borate; imidazoles such as N-methylimidazole, N-ethylimidazole, N-phenylimidazole and N-vinylimidazole; metal acetylacetonates such as titanium acetylacetonate, iron acetylacetonate and nickel acetylacetonate; amides; urea compounds; melamine compounds; isocyanates such as dimethylmethane diisocyanate, diphenylether diisocyanate, diphenylsulfone diisocyanate and tolylene diisocyanate; cyanates such as diphenylmethane dicyanate, diphenylether dicyanate, and diphenylsulfone dicyanate; phenolic compounds such as bisphenol A, bisphenol F, bisphenol S, pyrogallol, resercin, catechol, hydroquinone, and phenolic resins obtained by reaction of phenol with aldehydes or ketones; aromatic amines such as phenylenediamines, diaminodiphenylmethane, diaminodiphenylether, diaminodiphenylsulfone, diaminodiphenylsulfide, and halo-, alkyl- or N-alkyl-substituted derivatives thereof; aliphatic amines such as ethylenediamine, hexamethylenediamine and N-alkyl-substituted derivatives thereof; amino compounds such as those obtained by reaction of aniline with aldehydes; acid anhydrides such as phthalic anhydride, hexahydrophthalic anhydride, tetrahydrophthalic anhydride, methyltetrahydrophthalic anhydride, methylhexahydrophthalic anhydride, nadic anhydride, methylnadic anhydride, chlorendic anhydride, dodecylsuccinic anhydride, methylsuccinic anhydride, benzophenonetetracarboxylic anhydride, pyromellitic anhydride and maleic anhydride; and peroxides such as dicumyl peroxide, tert-butyl perbenzoate and methyl ethyl ketone peroxides. These curing agents are usually added in an amount ranging from about 0.01 to 25% by weight based on the total weight of the composition.

The heat-resistant resin compositions of the invention vary in viscosity according to the relative proportions of the components present therein. They are suitable for use in applications such as casting, molding, and the like because they can be used as the so-called solventless resin compositions. They are also useful in the fabrication of laminates because they can be easily dissolved in inert organic low-boiling solvents such as dioxane and tetrahydrofuran and then used for the purpose of impregnating glass cloth, non-woven fabric, and the like. When cured, the heat-resistant resin compositions of the invention provide a uniform cured texture because their components have good compatibility with each other. Moreover, these cured resins exhibit excellent heat resistance, mechanical properties and electrical insulating properties, and such properties are not appreciably deteriorated even if they are exposed to high temperatures (e.g. 180°-200° C. or higher) for a long period of time. Accordingly, the heat-resistant resin compositions of the invention can preferably be used in the fabrication of laminates, molded articles, prepregs, binding tapes, and bearings as well as for the coil insulation material, wedge material and layer insulation material in rotary machines.

At ordinary ambient temperatures, the heat-resistant resin compositions of the invention can be stored stably (i.e. without curing to an appreciable extent) for a period of at least about 6 months.

This invention will be more fully understood from the following examples. All parts and percentages are by weight unless otherwise indicated.

EXAMPLE 1

(A) Into a 5 liter three-necked flask fitted with a stirrer, thermometer and reflux condenser were charged aniline, phenol and formic acid (catalyst) in the respective amounts set forth in Table A below. The mixture was heated at 60°-75° C. to form a uniform system. Then, a 37% aqueous formaldehyde solution, in the amount set forth in Table A, was slowly added dropwise with stirring over a period of 2.5-3 hours. Upon completion of the addition, the mixture was allowed to react at 90°-100° C. for 1 hour. Thereafter, the mixture was stripped to 155°-165° C./20-15 mmHg to obtain a desired aniline-phenol-formaldehyde condensation product.

The softening point or appearance of each of the condensation products thus obtained is also set forth in Table A.

After filtration, the filtrate was heated at 90° C. under reduced pressure until the toluene was completely distilled off. Thus, a diallyl ether compound of bisphenol A

TABLE A

| Sample No. | Aniline (parts) | Phenol (parts) | Aqueous Formaldehyde Solution (parts) | Formic Acid (parts) | Softening Point | Symbol of Corresponding Maleimide Compound |
|---|---|---|---|---|---|---|
| 1 | 931.2 | 470.6 | 302.7 | 20.8 | Viscous Fluid | [I] |
| 2 | 931.2 | 235.3 | 302.7 | 10.4 | Viscous Fluid | [II] |
| 3 | 931.2 | 235.3 | 201.8 | 10.4 | Viscous Fluid | [III] |
| 4 | 931.2 | 470.6 | 605.3 | 20.8 | 60°–68° C. | [IV] |
| 5 | 931.2 | 470.6 | 907.9 | 20.8 | 123°–129° C. | [V] |
| 6 | 931.2 | 470.6 | 811.6 | 20.4 | 121°–125° C. | [VI] |

Into a three-necked flask similar to that described above were charged 900 g of each condensation product, 200 g of sodium acetate and 1,300 g of dimethylformamide. The reaction mixture was heated to 50°–70° C. with stirring and kept at that temperature for 1 hour. After the reaction mixture was cooled to room temperature, 900 g of maleic anhydride was added while the temperature was kept below 30° C. Upon completion of the addition, the reaction mixture was stirred for 1 hour, heated to 60°–70° C., and allowed to react at that temperature for 1 hour. After the reaction mixture was cooled to 45° C., 1,020 g of acetic anhydride was added. The reaction mixture was again heated to 60°–70° C. and allowed to react for 1.5 hours. Then, the reaction mixture was cooled to room temperature and poured into cold water having a volume 6–8 times that of the mixture to precipitate. The precipitate so formed was separated by filtration, washed twice with warm water at 40°–50° C. and once with cold water, and dried under reduced pressure to produce a desired maleimide compound which is identified by one of the symbols set forth in Table A above. The yield ranged from 77 to 95%.

(B) Into a 5 liter four-necked flask fitted with a stirrer, thermometer and reflux condenser were charged 456 g of bisphenol A, 230 g of potassium hydroxide, 1,200 ml of toluene and 800 ml of water. The mixture was heated to reflux with stirring for 1 hour. Thereafter, 500 g of allyl bromide was added slowly. The reaction mixture was allowed to react at 70° C. for 5 hours, cooled to room temperature, and separated into a toluene layer and an aqueous layer with a separatory funnel. The toluene layer was isolated, washed with water, and neutralized. Thereafter, anhydrous sodium sulfate was added to the toluene layer, which was then allowed to stand for 24 hours in order to remove any water.

having a viscosity of 0.88 poise at 25° C. was obtained in a yield of 560 g.

Then, 400 g of the above diallyl ether compound was heated at 180°–220° C. under reduced pressure to effect the Claisen rearrangement. As a result, a diallylbisphenolic compound having a viscosity of 21 poises at 25° C. was obtained. This compound corresponds to the bis(allylphenol) of Formula (III) in which X is

(C) A glycidyl ether type epoxy resin having a viscosity of 30–45 poises at 30° C. was prepared by reacting 308 g of the diallylbisphenolic compound obtained in (B) with 740 g of epichlorohydrin at 80°–95° C. for 40 minutes in 1 l of an aqueous solution containing 80 g of sodium hydroxide, separating the resinous layer so formed, washing it with water, and distilling off any water and unreacted epichlorohydrin.

The maleimide compounds, diallylbisphenolic compound and epoxy resin prepared as described above as well as other epoxy resins and several curing agents were blended in the proportions set forth in Table I to form a total of 10 solventless resin compositions. Each of these resin compositions was poured into a casting mold with a clearance of 2 mm, and heated first at 130° C. for 4 hours, then at 150° C. for 3 hours and finally at 200° C. for 12 hours to produce a molded plate. Several pieces of 20 mm×20 mm were cut from the plate, and some of them were used in a test for weight loss on heating while the rest for the measurement of electrical properties. The results are also set forth in Table I.

Table I

| Components | | | | A (parts) | B (parts) | C (parts) | D (parts) | E (parts) |
|---|---|---|---|---|---|---|---|---|
| Component A | | Maleimide Compound | [I] | 70 | — | — | — | — |
| | | | [II] | — | 60 | — | — | — |
| | | | [III] | — | — | 50 | — | — |
| | | | [IV] | — | — | — | 40 | — |
| | | | [V] | — | — | — | — | 30 |
| Component B | | Diallylbisphenolic Compound | | 30 | 40 | 50 | 30 | 40 |
| Epoxy Resin | | Epoxidized Diallylbisphenol Compound | | — | — | — | 17 | 15 |
| | | Epikote 828 (1) | | — | — | — | — | — |
| | | Araldite EPN-1138 (2) | | — | — | — | — | — |
| | | HN-2200 (3) | | — | — | — | 13 | 15 |
| Curing Agent | | Methylnadic Anhydride | | — | — | — | — | — |
| | | N,N-dimethylbenzylamine | | — | — | — | 0.03 | 0.03 |
| | | BF$_3$-monoethylamine | | — | 2.0 | — | — | — |
| | | Dicumyl Peroxide | | — | — | 1.5 | 1.2 | 1.2 |

Table I-continued

| | | 2.9 | 3.1 | 3.3 | 3.8 | 4.0 |
|---|---|---|---|---|---|---|
| Weight Loss (%) on Heating | at 200° C. for 1,000 hr. | 2.9 | 3.1 | 3.3 | 3.8 | 4.0 |
| | at 250° C. for 1,000 hr. | 5.7 | 5.9 | 6.4 | 7.8 | 8.9 |
| Volume Resistivity (Ω·cm) at 180° C. | | $9.4 \times 10^{13}$ | $6.7 \times 10^{13}$ | $2.8 \times 10^{13}$ | $8.6 \times 10^{12}$ | $4.1 \times 10^{12}$ |
| Dissipation Factor (%) at 180° C. | | 0.86 | 0.97 | 1.00 | 1.13 | 1.30 |

| Components | | | Resin Samples F (parts) | G (parts) | H (parts) | I (parts) | J (parts) |
|---|---|---|---|---|---|---|---|
| Component A | Maleimide Compound | [I] | — | — | 40 | 20 | 10 |
| | | [II] | — | — | — | 20 | — |
| | | [III] | — | 40 | — | — | — |
| | | [IV] | — | — | — | — | 20 |
| | | [V] | 50 | — | — | — | — |
| Component B | Diallylbisphenolic Compound | | 40 | 40 | 50 | 30 | 40 |
| | Epoxidized Diallylbisphenol Compound | | 6 | 20 | — | — | — |
| Epoxy Resin | Epikote 828 (1) | | — | — | — | 12 | — |
| | Araldite EPN-1138 (2) | | — | — | 15 | — | 20 |
| | HN-2200 (3) | | 4 | 10 | 5 | 8 | — |
| | Methylnadic Anhydride | | — | 10 | 10 | — | 20 |
| Curing Agent | N,N-dimethylbenzylaine | | — | 0.05 | 0.005 | 0.01 | 0.05 |
| | BF$_3$-monoethylamine | | 0.5 | — | — | — | — |
| Dicumyl Peroxide | | | 1.5 | — | 1.0 | 1.5 | 1.0 |
| Weight Loss (%) on Heating | at 200° C. for 1,000 hr. | | 3.5 | 4.0 | 3.6 | 3.6 | 4.3 |
| | at 250° C. for 1,000 hr. | | 7.2 | 8.3 | 7.4 | 7.5 | 9.2 |
| Volume Resistivity (Ω.cm) | at 180° C. | | $3.0 \times 10^{13}$ | $5.3 \times 10^{12}$ | $9.5 \times 10^{12}$ | $8.9 \times 10^{12}$ | $2.6 \times 10^{12}$ |
| Dissipation Factor (%) | at 180° C. | | 0.98 | 1.42 | 1.06 | 1.11 | 1.57 |

Notes:
(1) A bisphenol A-epichlorohydrin type epoxy resin, manufactured by Shell Company.
(2) An epoxy-phenol novolak type epoxy resin, manufactured by Chiba Geigy Company.
(3) Methyltetrahydrophthalic anhydride, manufactured by Hitachi Kasei K.K.

EXAMPLE 2

An orthoallylphenol novolak compound having a viscosity of 10–15 poises at 30° C. was prepared by reacting 268.4 g of orthoallylphenol with 32.4 g of a 37% aqueous formaldehyde solution at 80°–90° C. for 2–3 hours in the presence of 0.2 ml of 35% hydrochloric acid. This compound corresponds to the poly(allylphenol) of Formula (IV) in which R'$_1$ and R'$_2$ are each hydrogen and the sum of m and n is equal to from 0 to about 6.

The orthoallylphenol novolak compound thus obtained, the maleimide compounds prepared in Example 1 (A), an epoxy resin, a copolymerizable monomer, an N-substituted monomaleimide, and several curing agents were blended in the proportions set forth in Table II below to form a total of 7 resin compositions.

Model conductors (6 mm × 25 mm × 420 mm), each of which consisted of a copper plate having 4 turns of glass fiber tape (0.18 mm thick and 25 mm wide) wound thereon with ½ lap, were each impregnated with each of these resin compositions under reduced pressure. Thereafter, they were heated first at 130° C. for 2 hours, then at 150° C. for 3 hours and finally at 200° C. for 15 hours to produce insulated conductors. The electrical properties of these insulated conductors were measured under various conditions. The results are also set forth in Table II.

Table II

| Components | | | Resin Samples K (parts) | L (parts) | M (parts) | N (parts) | O (parts) | P (parts) | Q (parts) |
|---|---|---|---|---|---|---|---|---|---|
| Component A | Maleimide Compound | [I] | 40 | — | — | — | + | + | 50 |
| | | [II] | — | 50 | — | — | — | 40 | — |
| | | [III] | — | — | 40 | — | — | — | — |
| | | [IV] | — | — | — | 40 | — | — | — |
| | | [V] | — | — | — | — | 10 | — | — |
| Component B | Orthoallylphenol Novolak | | 40 | 50 | 50 | 30 | 40 | 30 | 50 |
| Epoxy Resin | Epikote 808 | | 10 | — | — | — | 12 | 10 | — |
| Monomer | Diallyl Isophthalate | | — | — | — | 10 | — | 10 | — |
| Maleimide | Orthomethyl-N-phenylmaleimide | | — | — | 10 | 20 | — | — | — |
| | Methylnadic Anhydride | | 10 | — | — | — | ta 8 | 10 | — |
| Curing Agent | N-methylimidazole | | 0.5 | 1.0 | 1.0 | 0.5 | 0.5 | 0.5 | 1.0 |
| | Dicumyl Peroxide | | 1.5 | 2.0 | 1.5 | 1.0 | 1.0 | 1.0 | 1.5 |
| Breakdown Voltage (kV) at 220° C. | Normal State | | 23.0 | 21.8 | 20.6 | 20.2 | 22.4 | 21.5 | 21.5 |
| | After Immersed in Water for 40 hr. | | 21.5 | 19.8 | 18.3 | 19.2 | 19.5 | 20.4 | 19.7 |
| Insulation Resistance (Ω) | Normal State | | >$10^{14}$ | >$10^{14}$ | >$10^{14}$ | >$10^{14}$ | >$10^{14}$ | >$10^{14}$ | >$10^{14}$ |
| | After Immersed in Water for 40 hr. | | $8 \times 10^{13}$ | $6.5 \times 10^{13}$ | $5.2 \times 10^{13}$ | $4.0 \times 10^{13}$ | $8.2 \times 10^{13}$ | $7.5 \times 10^{13}$ | $5.3 \times 10^{13}$ |
| Dissipation Factor (%) at 100° C. | 1 kV | | 0.53 | 0.43 | 0.62 | 0.65 | 0.58 | 0.55 | 0.57 |
| | 2 kV | | 0.76 | 0.64 | 0.80 | 0.86 | 0.60 | 0.74 | 0.78 |
| | 3 kV | | 2.40 | 2.05 | 2.78 | 3.04 | 2.00 | 2.31 | 2.65 |
| Insulation Resistance (Ω) | After Heated at 200° C. for 300 hr. | | >$10^{14}$ | >$10^{14}$ | >$10^{14}$ | >$10^{14}$ | >$10^{14}$ | >$10^{14}$ | >$10^{14}$ |

EXAMPLE 3

Into a 5 liter three-necked flask fitted with a stirrer, thermometer and reflux condenser were charged 343.25 g of maleic anhydride, 249.25 g of HN-2200 and an appropriate amount of dimethylformamide. These ingredients were vigorously stirred to form a uniform solution. Then, 577 g of the aniline-phenol-formaldehyde condensation product No. 2 prepared in Example 1 (A) was dissolved in 400 g of dimethylformamide and added to the above solution with stirring over a period of 40-50 minutes. The resulting reaction mixture was heated at 70° C. for 1 hour to produce an amic acid.

Then, 637.25 g of acetic anhydride and 82 g of anhydrous sodium acetate were added to the above reaction mixture and allowed to react at 70° C. for 2.5 hours. Thereafter, the reaction mixture was cooled to 8° C. and poured into 25 l of ice-cold water to precipitate. The precipitate so formed was separated, washed repeatedly with ice-cold water, and dried under reduced pressure to produce a desired maleimide compound [VII]. The yield was 94%.

Then, 150 parts of the maleimide compound [VII] thus obtained, 50 parts of the orthoallylphenol novolak compound prepared in Example 2, 15 parts of the aniline-phenolformaldehyde condensation product No. 3 prepared in Example 1 (A), 6 parts of Araldite ECN 1299 (a cresol novolak type epoxy resin, manufactured by Chiba Geigy Company), 3 parts of methyl ethyl ketone anil (a Schiff base type cure accelerator), 3 parts of 4,4-dibenzylidenediaminodiphenylmethane, and 2.5 parts of dicumyl peroxide were dissolved in dioxane to form a solution having a resin content of 50%. Part of this resin solution was applied to aminosilane-treated plain-woven glass cloth, air-dried, and then dried at 150° C. for 30 minutes to make 8 pieces (200 mm×200 mm) of prepreg having a resin pickup of about 45%. These 8 pieces were superposed one upon another and pressed for 1 hour on a press kept at 180° C. to make a laminated sheet, which was then after-cured at 200° C. for 5 hours. Upon heating at 250° C. for 1,000 hours, the weight loss of this laminated sheet was found to be 5.6%. Its mechanical strength was found to be 74% of the initial value. When its electrical properties were measured (at room temperature) after heating under various conditions, satisfactory results were obtained as summarized in Table III below.

Table III

| Heating Conditions | Volume Resistivity ($\Omega$-cm) | Dissipation Factor (%) |
|---|---|---|
| 200° C., 1,000 hr. | $>10^{15}$ | 0.03 |
| 225° C., 1,000 hr. | $9.0 \times 10^{14}$ | 0.14 |
| 250° C., 1,000 hr. | $6.3 \times 10^{13}$ | 0.34 |

On the other hand, 40 parts of natural graphite having an average particle diameter of 5.5$\mu$ was slowly added, with stirring, to 120 parts of the rest of the above resin solution to obtain a pasty composition. The pasty composition so formed was filtered under reduce pressure to remove the solvent, and then dried at 120° C. Employing a mold temperature of 200° C. and a mold pressure of 180 kg/cm$^2$, the composition was molded to make a plate, which was then after-cured at 210° C. This plate was mounted on Model EFM-III-B Friction Abrasion Tester (Tōyō Baldwin Company). When measured under a load of 100 kg at a rotational speed of 50 cm/sec, it showed a coefficient of friction ($\mu$) of 0.18 and was heated to a temperature of 160° C.

EXAMPLE 4

Into a 2 liter three-necked flask fitted with a stirrer, thermometer and reflux condenser were charged 336.5 g of aniline, 268.4 g of orthoallylphenol and 8.3 g of formic acid. These ingredients were heated at 60°-70° C. with stirring to form a uniform solution. Then, 121 g of a 37% aqueous formaldehyde solution was added with stirring over a period of 2.5 hours. The resulting mixture was heated to 90°-100° C. and allowed to react at that temperature for 2 hours. This reaction mixture was stripped under reduced pressure to remove any water and unreacted reactants and thereby obtain a desired liquid aniline-phenolic compound-formaldehyde condensation product (No. 7).

Then, 200 g of the condensation product No. 7 thus obtained was reacted with 184 g of maleic anhydride in acetone to produce a corresponding amic acid. This amic acid was separated by filtration, dried, and added to a system of 260 g of dimethylformamide, 300 g of acetic anhydride and an appropriate amount of sodium acetate. The resulting mixture was slowly heated to 60°-80° C. and allowed to react at that temperature for 1 hour. Thereafter, the reaction mixture was cooled to room temperature and poured into 15 l of water to precipitate. The precipitate so formed was separated by filtration, washed three times with water, and dried under reduced pressure to produce a desired maleimide compound [VIII]. The yield was 89%.

Then, 150 parts of the maleimide compound [VIII] thus obtained, 100 parts of the orthoallylphenol novolak compound prepared in Example 2, 30 parts of Araldite EPN-1138, 20 parts of 4,4'-diaminodiphenylmethane and 2 parts of dicumyl peroxide were dissolved in dioxane to form a 30% resin solution. Part of the resin solution was used in the same manner as in Example 3 to make a laminated sheet. Upon heating at 200° C. for 300 hours, the bending strength of this laminated sheet was found to be 46 kg/cm$^2$ as compared with the initial value of 50 kg/cm$^2$.

On the other hand, the rest of the above resin composition was applied to a portion of an iron plate (25 mm wide, 120 mm long, and 1 mm thick) which had been rubbed with sandpaper and degreased. Another iron plate of the same size was superposed on the resin-applied portion of the first iron plate with an overlapping area of 3 cm$^2$, pressed at 170° C. for 1 hour under a pressure of 0.2-2 kg/cm$^2$, and then after-cured at 200° C. for 15 hours. Thus, several specimens for measuring the shear strength of the joint were prepared. When such specimens were tested at room temperature and at 180° C., the shear strength of the joint was found to be 131 kg/cm$^2$ and 96 kg/cm$^2$, respectively.

EXAMPLE 5

The procedure employed for the preparation of the condensation product No. 1 in Example 1 (A) was repeated, except that 750 g of tert-butylphenol and 42 g of oxalic acid were used in place of the phenol and the formic acid, respectively. Thus, an aniline-tert-butyl-phenol-formaldehyde condensation product (No. 8) was prepared.

Subsequently, the procedure employed for the preparation of the maleimide compound [VII] in Example 3 was repeated, except that 606 g of the above condensation product No. 8 was used in place of the condensation product No. 2. Thus, a maleimide compound [IX] was prepared.

Then, 60 parts of the maleimide compound [IX] thus obtained, 40 parts of the diallylbisphenolic compound prepared in Example 1 (B), 35 parts of Araldite EPN- 1138 and 25 parts of HN-2200 were blended together and heated at 60°-80° C. to form a uniform solution. Thereafter, 0.05 part of N,N-dimethylbenzylamine and 1 part of dicumyl peroxide were added and mixed well. The resulting resin composition was used in the same manner as in Example 1 to make a molded plate. Several pieces of 10 mm×10 mm were cut from the plate and used for the measurement of weight loss on heating and electrical properties. The results are summarized in Table IV below.

Table IV

| Heating Conditions | Volume Resistivity ($\Omega \cdot cm$) | Dissipation Factor (%) |
|---|---|---|
| 200° C., 1,000 hr. | $>10^{15}$ | 0.04 |
| 225° C., 1,000 hr. | $8.4 \times 10^{14}$ | 0.16 |
| 250° C., 1,000 hr. | $5.6 \times 10^{13}$ | 0.41 |

EXAMPLE 6

To 1 l of an aqueous solution containing 130 g of sodium hydroxide was added 278 g of bisphenol S. The mixture was heated to reflux for 2 hours and then cooled to room temperature. After 250 g of allyl bromide was added, the reaction mixture was heated to 60°-80° C. and allowed to react at that temperature for 5 hours. Thus, a bis(allyl phenyl ether) compound having a melting point of 139°-140° C. was prepared in the form of white microcrystals. The yield was 92%. This compound corresponds to the bis(allyl phenyl ether) of Formula (I) in which $R_1$ through $R_8$ are each hydrogen and X is

Then, 30 g of the bis(allyl phenyl ether) compound thus obtained, 50 g of the diallylbisphenolic compound prepared in Example 1 (B), 300 g of the maleimide compound [VIII] prepared in Example 4, 50 g of N-(2-methylphenyl)maleimide and 40 g of Araldite EPN-1138 were dissolved in dioxane. Thereafter, 5 g of dicumyl peroxide and 5 g of N-methylimidazole were added to form a resin solution.

This resin solution was used in the same manner as in Example to prepare several specimens for measuring the shear strength of the joint. When such specimens were tested at room temperature and at 180° C., the shear strength of the joint was found to be 139 kg/cm² and 94 kg/cm², respectively. Furthermore, when such specimens were each heated at 200° C., 225° C. and 250° C. for 500 hours, respectively, and then tested at room temperature, the shear strength of the joint was found to be 136 kg/cm², 120 kg/cm² and 90 kg/cm², respectively.

What we claim is:

1. A heat resistant resin composition comprising
    (A) at least one maleimide compound obtained by reacting a condensation product of aniline, an aromatic hydroxy compound having at least one hydroxyl group directly attached to a carbon atom in the aromatic ring, which may contain at least one hydrocarbon substituent group or at least one non-hydrocarbon substituent group, and formaldehyde with an acid anhydride reactant containing at least 40 mole % of maleic anhydride, the molar ratio of aniline to aromatic hydroxy compound being in the range of 5:95 to 95:5, the ratio of total moles of aniline and aromatic hydroxy compound to moles of formaldehyde being in the range of 10:1 to 1:4, the ratio of amine equivalents to acid equivalents being 1:1 or lower, and
    (B) at least one allyl compound selected from the group consisting of polyallyl phenyl ether compounds and polyallyl phenolic compounds each having at least two allyl radicals, in the proportion of about 20 to 95% by weight of compound A and from about 5 to 80% by weight of component B based on the total weight of the composition.

2. The composition of claim 1 wherein the condensation product is obtained by reacting aniline, the aromatic hydroxy compound and formaldehyde in such a proportion that the ratio of the total moles of aniline and the aromatic hydroxy compound to the moles of formaldehyde is in the range of from 5:1 to 1:2.

3. The composition of claim 1 wherein the condensation product contains the amino groups derived from aniline and the hydroxyl groups derived from the aromatic hydroxy compound in an equivalent ratio ranging from 10:90 to 95:5.

4. The composition of claim 1 wherein the polyallyl phenyl ether compounds are selected from the group consisting of bis(allyl phenyl ether)s of the formula:

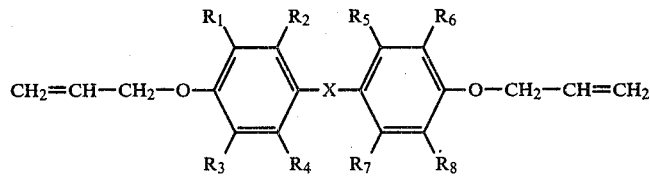

where X represents an $-CH_2-$,

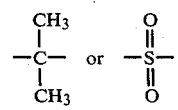

radical, and $R_1$ through $R_8$ independently represent hydrogen, alkyl or halo radicals, and poly(allyl phenyl ether)s of the formula:

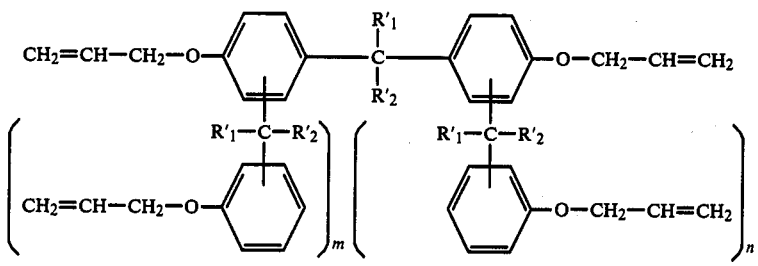

where R′₁ and R′₂ independently represent hydrogen, alkyl or phenyl radicals, and m and n are whole numbers equal to from 0 to 4.

5. The composition of claim 1 wherein the polyallylphenolic compounds are selected from the group consisting of bis(allylphenol)s of the formula:

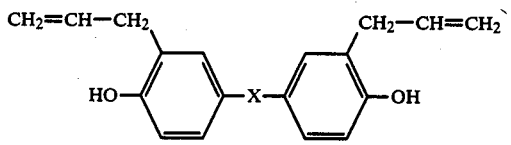

where X represents a —CH₂—,

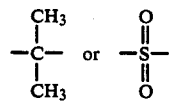

radical, and poly(allylphenol)s of the formula:

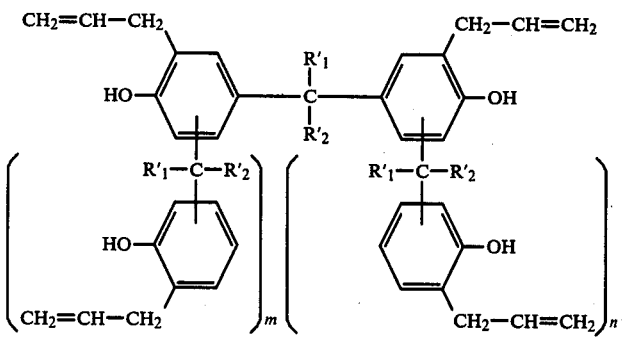

where R′₁ and R′₂ independently represent hydrogen, alkyl or phenyl radicals, and m and n are whole numbers equal to from 0 to 4.

6. The composition of claim 1 wherein up to 60% by weight of the component A is replaced by at least one maleimide selected from the group consisting of N,N′-disubstituted bismaleimides and N-substituted monomaleimides.

7. The composition of claim 1 further including at least one vinyl monomer copolymerizable with the component A or B in an amount ranging up to 40% by weight based on the total weight of the components A and B.

8. The composition of claim 1 further including one or more epoxy resins in such an amount as to provide not greater than three epoxy equivalents for each —OH group present in the composition.

9. The composition of claim 1 further including one or more curing agents.

10. The composition of claim 1 being diluted with an inert organic low-boiling solvent.

11. The composition of claim 1, wherein the aromatic hydroxy compound is selected from the group consisting of phenol, aliphatic-substituted phenols, halo-substituted phenols, aromatic-substituted phenols, bisphenols, dihydric phenols, fused ring type phenols, and amino-substituted phenols.

* * * * *